P. F. CHANUTE.
WHEEL MOUNT.
APPLICATION FILED MAR. 21, 1914.
1,140,573.
Patented May 25, 1915.
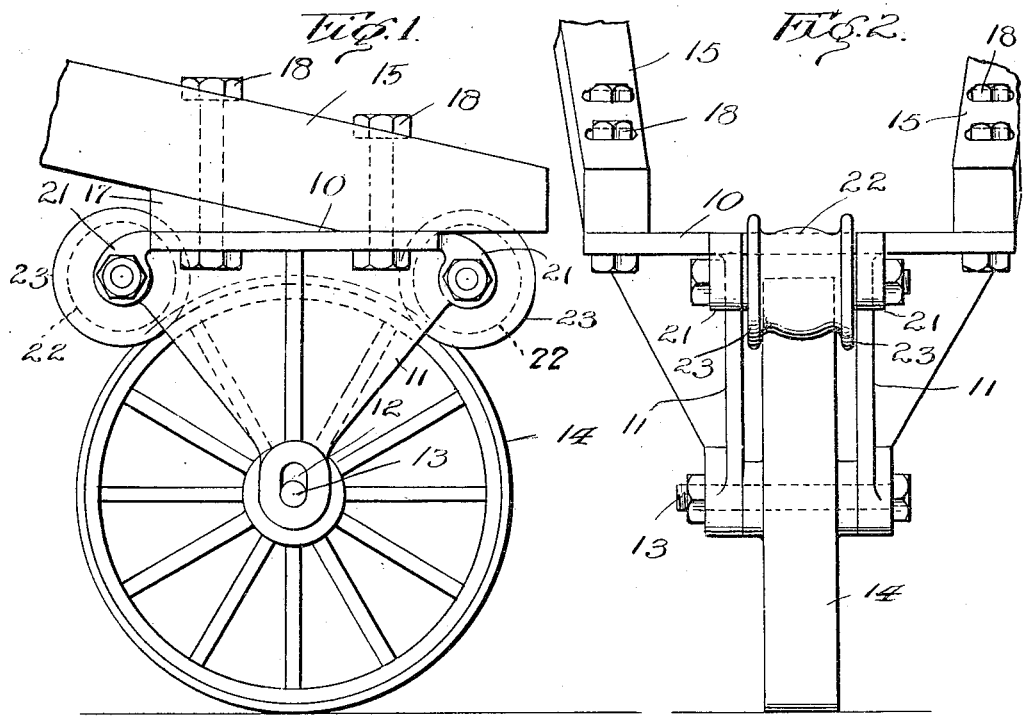
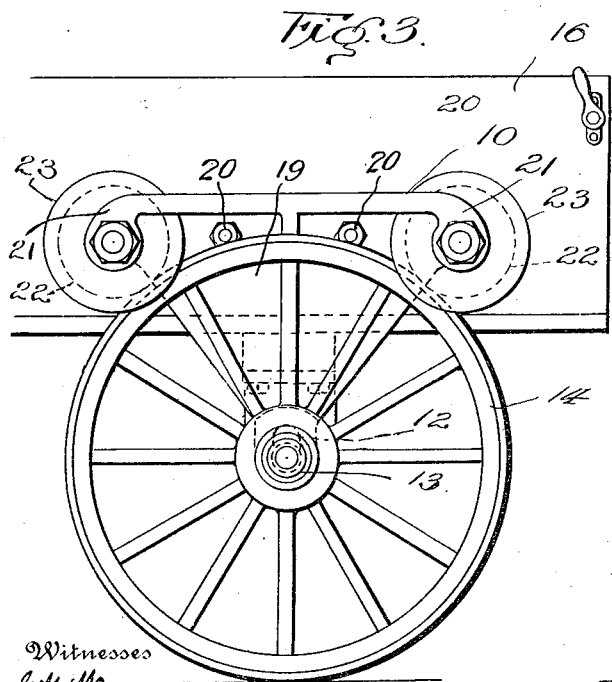
Inventor
P. F. Chanute

UNITED STATES PATENT OFFICE.

PAUL F. CHANUTE, OF NEW ORLEANS, LOUISIANA, ASSIGNOR OF ONE-HALF TO GUSTAVE A. LLAMBIAS, OF NEW ORLEANS, LOUISIANA.

WHEEL-MOUNT.

1,140,573.    Specification of Letters Patent.    Patented May 25, 1915.

Application filed March 21, 1914. Serial No. 826,378.

*To all whom it may concern:*

Be it known that I, PAUL F. CHANUTE, citizen of the United States, residing at New Orleans, in the parish of Orleans and State of Louisiana, have invented certain new and useful Improvements in Wheel-Mounts, of which the following is a specification.

This invention relates to improvements in mounting the traction wheels of vehicles of various kinds, such as wheelbarrows, freight trucks, passenger vehicles, and the like, and has for one of its objects to provide a simply constructed device whereby the maximum leverage and power is secured and the frictional resistance is reduced.

Another object of the invention is to provide a simply constructed device which may be applied without material structural change in the device and no change whatever in the wheels to which it is applied, and which is adapted to various sizes of wheels and to wheels employed upon various forms of vehicles.

With these and other objects in view the invention consists in certain novel features of construction as hereinafter shown and described and then specifically pointed out in the claims.

The improved device may be applied without material structural change to vehicles of various forms and it is not desired therefore to limit the invention in this respect, but for the purpose of illustration the improved device is shown applied to a conventional wheelbarrow frame and likewise to a portion of an ordinary freight truck or like vehicle, and in the drawings—

Figure 1 is a side elevation of the forward portion of a conventional wheelbarrow frame with the improvement applied. Fig. 2 is a front elevation of the parts shown in Fig. 1. Fig. 3 is a side elevation of a portion of a conventional farm or freight wagon with the improvement applied. Fig. 4 is a rear elevation of the parts shown in Fig. 3.

Corresponding and like parts are referred to in the following description and indicated in all the views of the drawings by the same reference characters.

The improved device comprises in general a supporting member, preferably in bracket form and represented as a whole at 10 and having depending portions 11 each provided with a perpendicular bearing slot 12 to receive the axle 13 of a wheel 14. By this means the wheel is movable vertically relative to the bracket member, but is prevented from lateral movement by the sides of the slots.

When applied to a wheelbarrow, as represented in Figs. 1 and 2, two of the depending portions 11 and their slots 12 will be employed, the member 10 being bolted or otherwise secured to the side members 15 of the wheelbarrow frame, and when the improved device is applied to the body of a farm wagon or like vehicle the bracket devices will be attached to the opposite sides of the box portion 16 as shown in Figs. 3 and 4. The side members 15 of a wheelbarrow are usually arranged in an inclined position, while the member 10 will be supported in a horizontal position with wedge-shaped blocks 17 between the members 15 and 10, as shown in Fig. 1, with clamp bolts or like securing devices connecting the members 10, 15 and 17.

When employed upon a freight or farm vehicle, as shown in Figs. 3 and 4, each of the body portions 10 will preferably be provided with a web 19 bearing against the side of the body 16 to receive holding bolts 20.

The only change necessary to adapt the device to vehicles of various kinds is to slightly change the construction of the body 10 to adapt it to the various shapes and sizes of the vehicle, but this does not constitute a departure from the principle of the invention or sacrifice any of its advantages.

At its ends the body portion 10 is provided with downwardly curving bearings 21 to receive friction rollers 22 for bearing upon the periphery of the traction wheel 14, as shown. The rollers 22 are provided with flanges 23 which extend over the edges of the traction wheel and prevent lateral displacement between the members 14 and 22. In Fig. 1 the body of the roller 22 is shown with a curved outer face so that it bears by the curved face upon the confronting face of the rim of the wheel 14 and engages the latter with a rolling contact in event of any slight lateral movement of the vehicle upon the axle, thereby materially reducing the friction and preventing undue wear between the parts.

By this simple arrangement the load of the vehicle is transmitted to the wheel upon the upper portion of the tread by the flanged rollers, preferably spherical, as shown in Fig. 2, and held in position by the depending portions 11 having the slots 12 whereby the necessary vertical movement is permitted between the wheels 14 and bearing axle 13, while at the same time the parts are held from lateral displacement.

Having thus described the invention, what is claimed as new is:

1. In a device of the class described, a supporting body, a supporting member depending from said body and having bearings in its upper portion spaced apart and in alinement horizontally and with an intermediate vertically extending bearing in its lower part, the sides of said vertical bearing being disposed in parallel relation, bearing rollers carried by said spaced bearings, an axle engaged by its journal in said vertical bearing and held from lateral movement thereby, and a bearing wheel mounted upon said axle and engaged by said rollers.

2. A support including bearings spaced apart and in horizontal alinement and a depending portion having a vertically elongated bearing adapted to receive an axle, and bearing rollers mounted for rotation in said spaced bearings and having spherical faces and spaced flanges, said spherical faces adapted to engage the periphery of a wheel mounted upon said axle and said flanges adapted to bear over the sides of the rim of the wheel.

3. In a device of the character described, a supported member, a bracket attached to said supported member, said bracket being triangular, the apex of the bracket extending downward, bearings formed upon said bracket, adjacent the base of said triangle, rollers mounted in said bearings, the lower end of the bracket being formed with a vertical slot, a wheel, and an axle, the axle passing through the slot and supporting the wheel in contact with said rollers, the axle being vertically movable.

In testimony whereof I affix my signature in presence of two witnesses.

PAUL F. CHANUTE. [L. S.]

Witnesses:
J. B. ESNAN,
DELVAILLE H. THÉARD.

Copies of this patent may be obtained for five cents each, by addressing the "Commissioner of Patents, Washington, D. C."